M. B. SAAVEDRA.
AEROPLANE.
APPLICATION FILED SEPT. 24, 1910.
998,402.
Patented July 18, 1911.
6 SHEETS—SHEET 1.
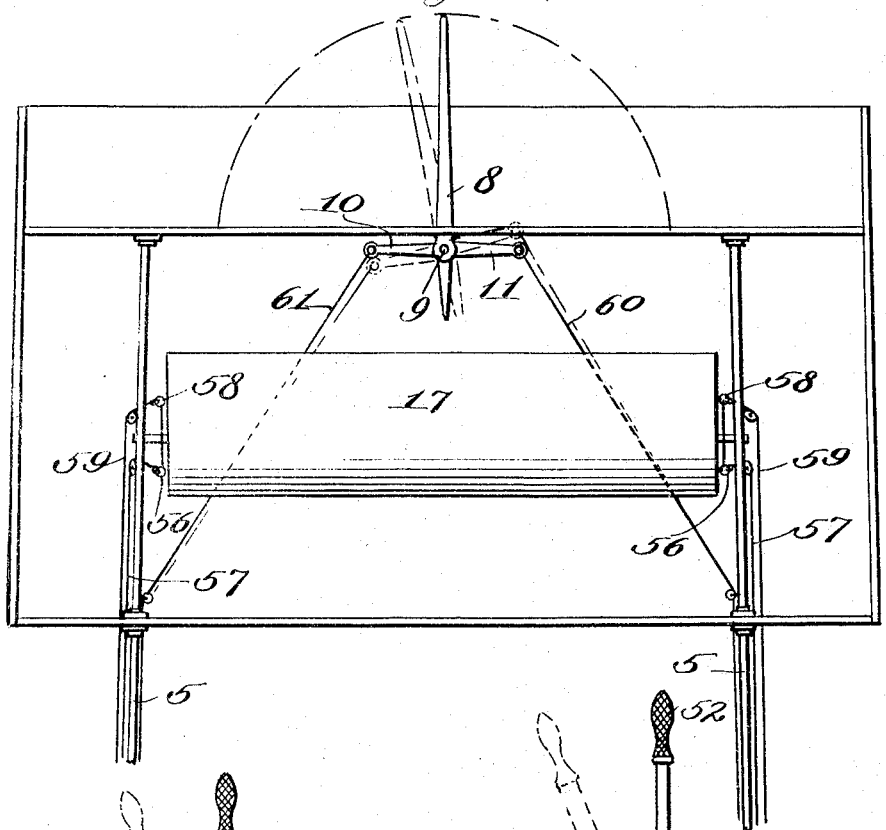
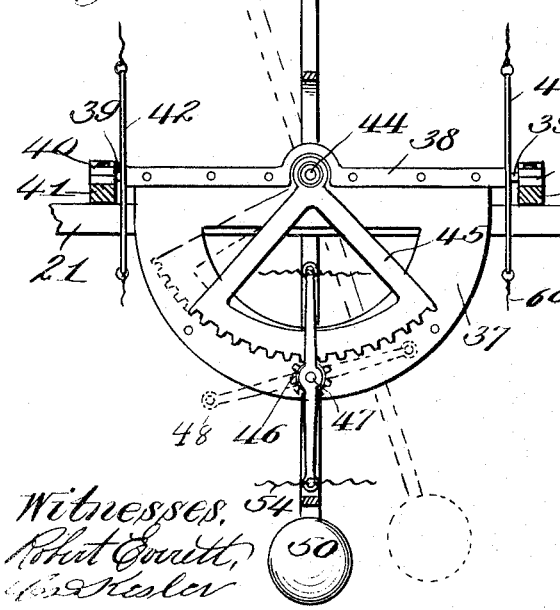
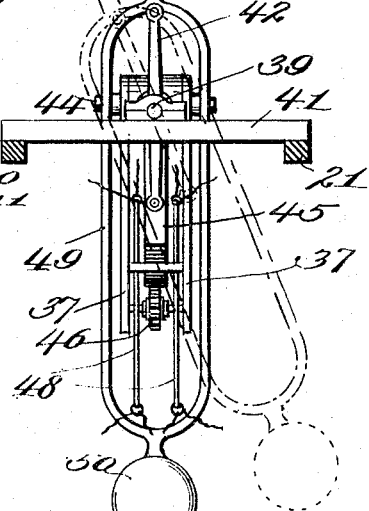
Witnesses
Inventor
Manuel B. Saavedra,
By James L. Norris, Atty.

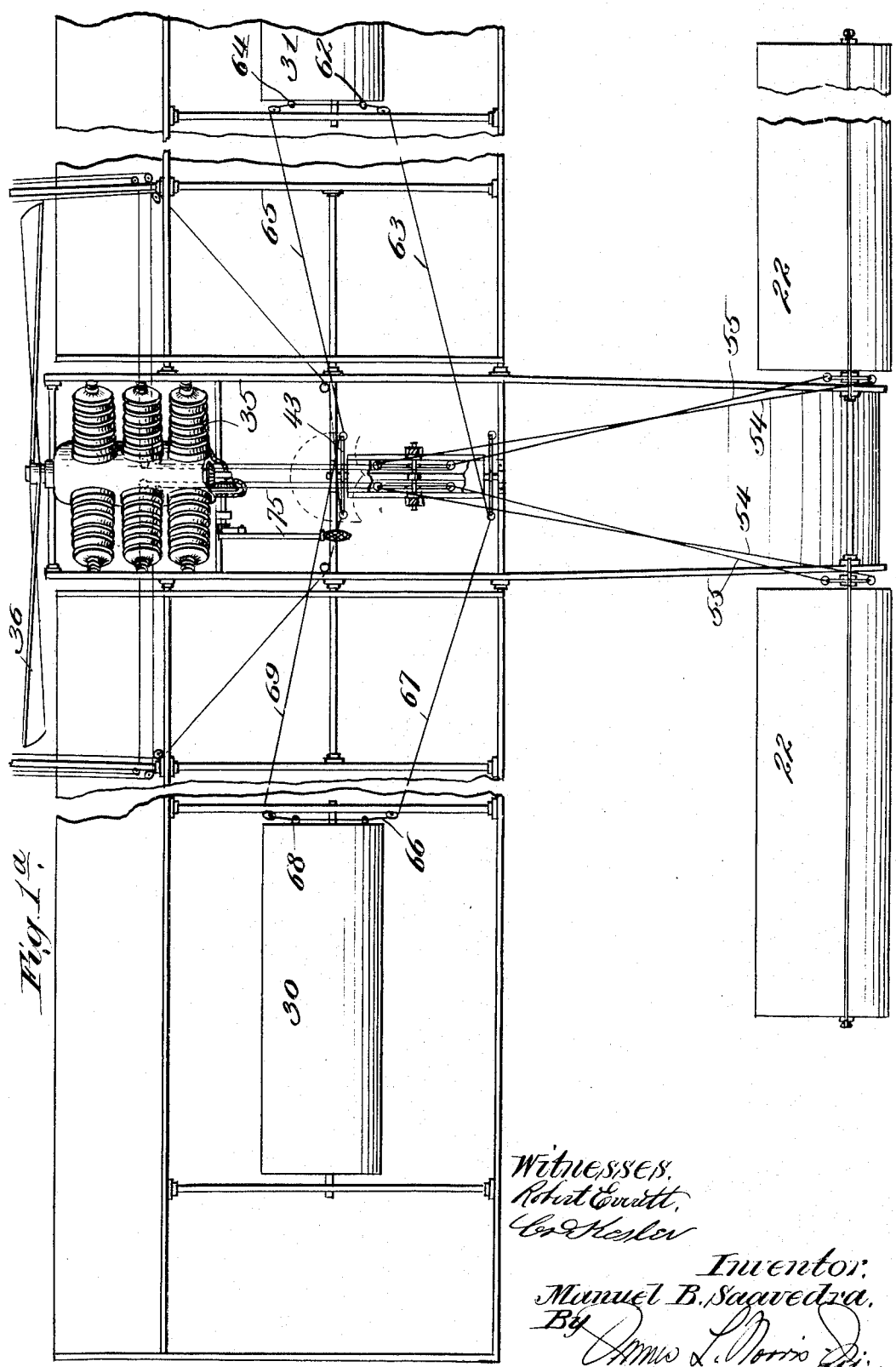

M. B. SAAVEDRA.
AEROPLANE.
APPLICATION FILED SEPT. 24, 1910.
998,402.
Patented July 18, 1911.
6 SHEETS—SHEET 3.
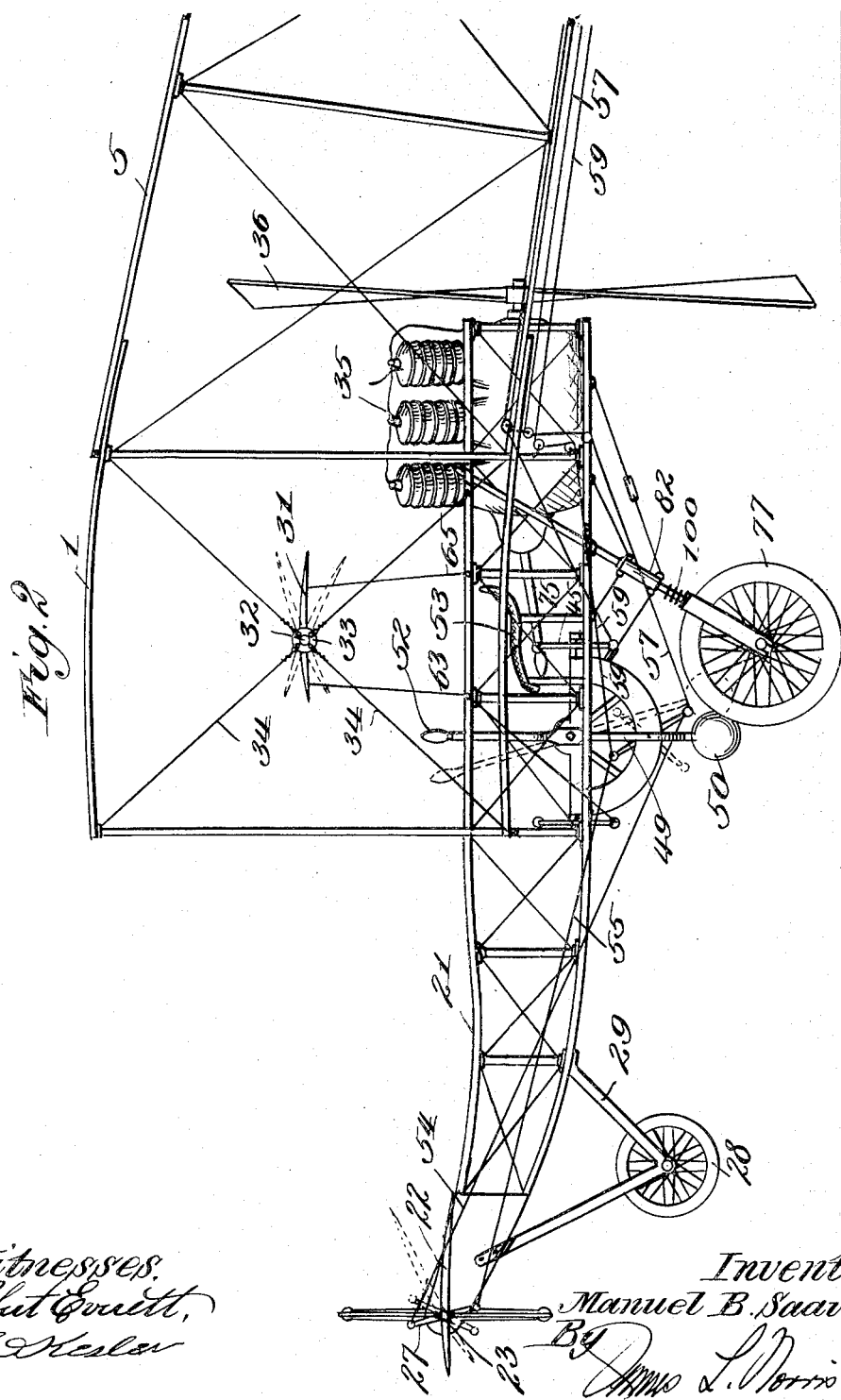

M. B. SAAVEDRA.
AEROPLANE.
APPLICATION FILED SEPT. 24, 1910.
998,402.
Patented July 18, 1911.
6 SHEETS—SHEET 4.
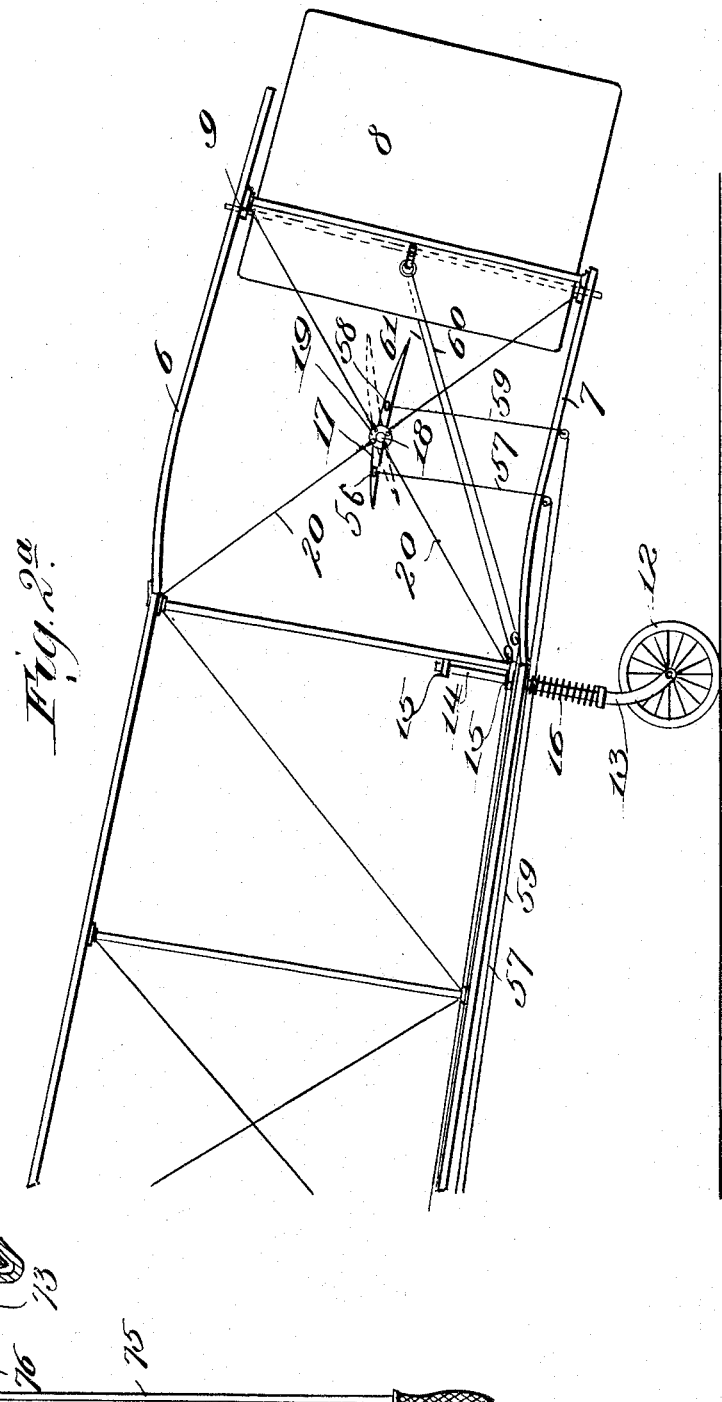
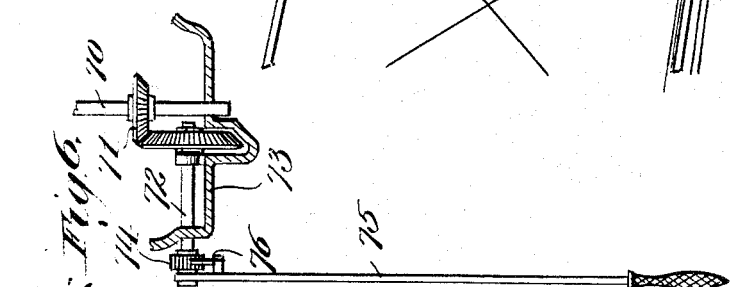
Witnesses.
Inventor:
Manuel B. Saavedra,
By M. B. SAAVEDRA.
AEROPLANE.
APPLICATION FILED SEPT. 24, 1910.
998,402.
Patented July 18, 1911.
6 SHEETS—SHEET 5.
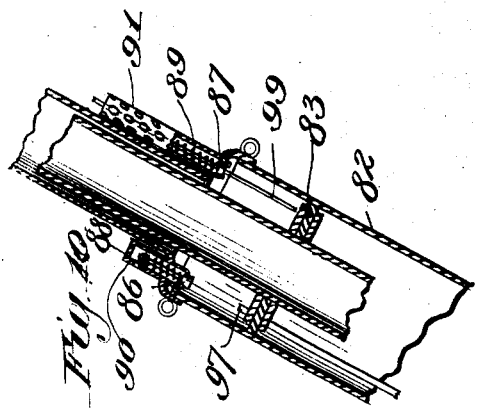
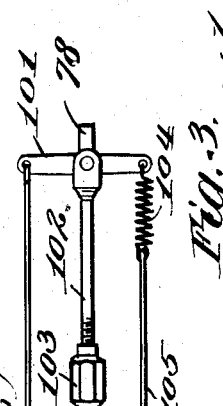
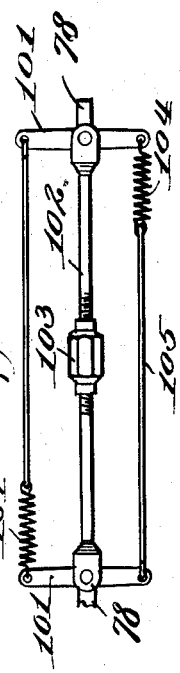
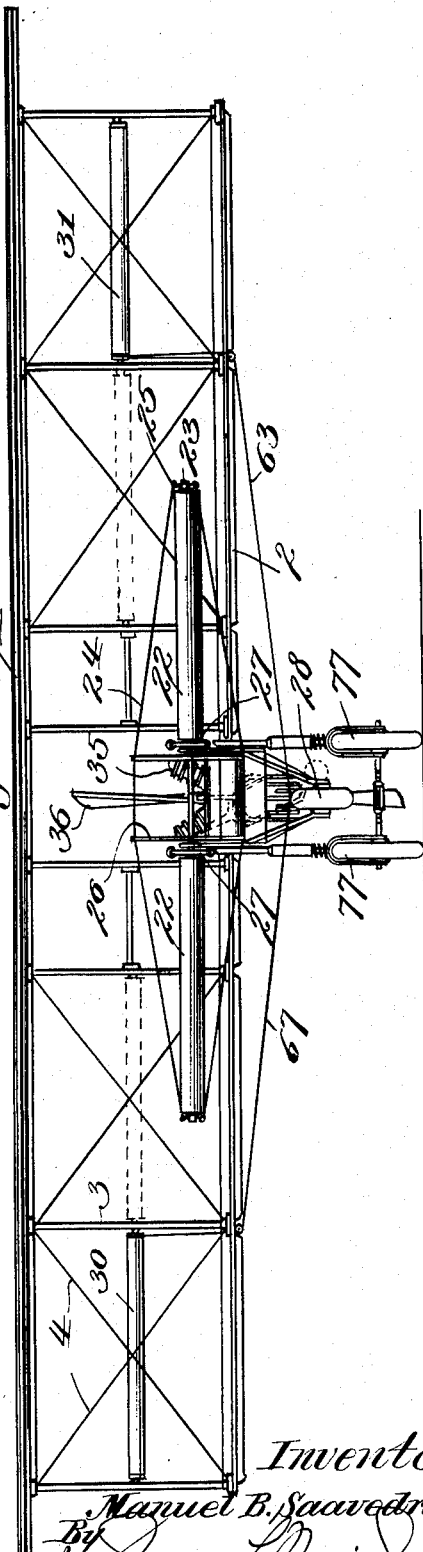
Witnesses.
Inventor:
Manuel B. Saavedra,
By

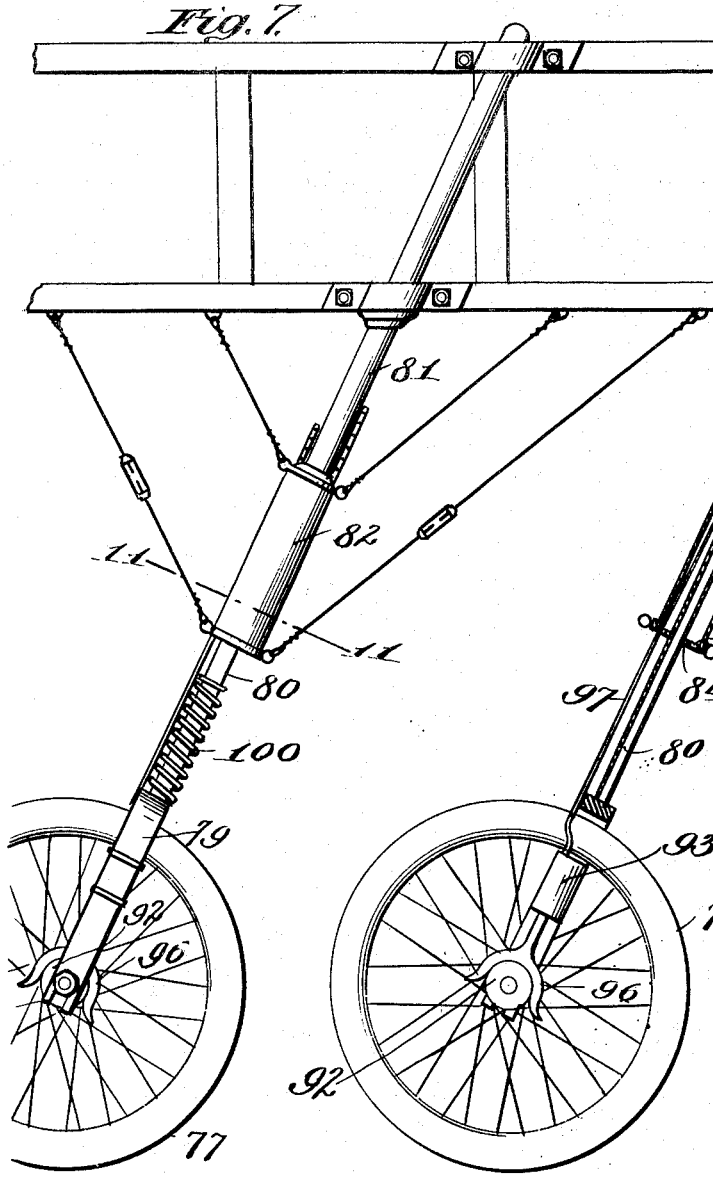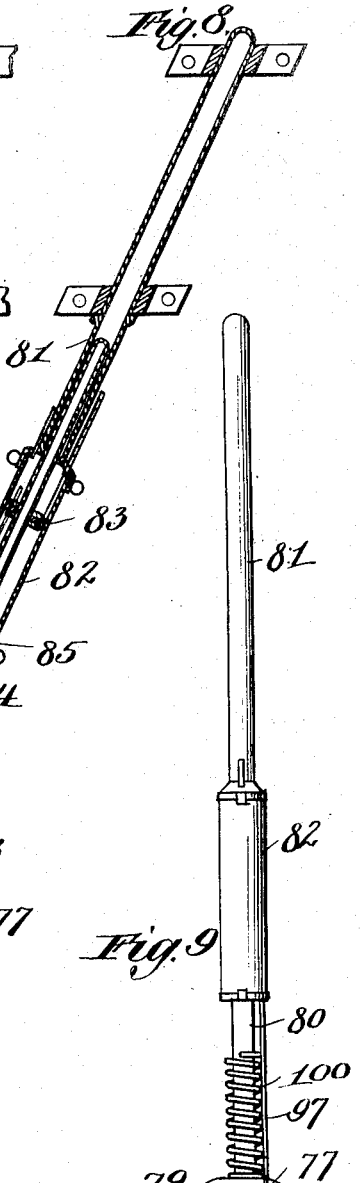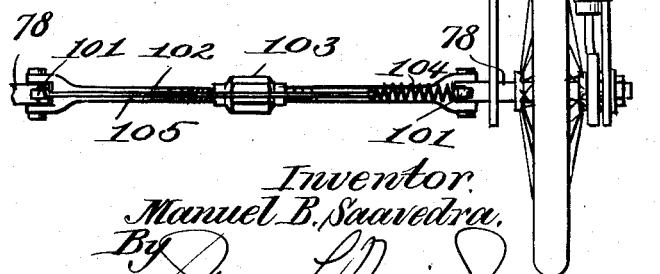

UNITED STATES PATENT OFFICE.

MANUEL B. SAAVEDRA, OF HABANA, CUBA.

AEROPLANE.

998,402.  Specification of Letters Patent.  Patented July 18, 1911.

Application filed September 24, 1910. Serial No. 583,627.

*To all whom it may concern:*

Be it known that I, MANUEL B. SAAVEDRA, a citizen of the Republic of Cuba, residing at Habana, Cuba, have invented certain new and useful Improvements in Aeroplanes, of which the following is a specification.

The present invention relates to improvements in aeroplanes and other craft adapted for aerial navigation, and it has for its primary object to provide means for automatically maintaining equilibrium of the apparatus during flight, such means according to the present invention being capable of acting immediately and automatically to return the apparatus to a balanced or horizontal position should it become inclined laterally under the influence of a gust of wind or from any other cause and to maintain the apparatus in such balanced position, and the said means is also capable of acting immediately to return the apparatus to a horizontal position with respect to its length or longitudinal axis should the bow or stern be deflected toward a downward or upward course, the means which automatically maintains equilibrium of the apparatus, however, being under the control of the aviator.

Other objects of the invention are to provide means for diminishing or preventing shocks to the wheels or supports of the apparatus or machine in landing, to provide supporting wheels which are so connected as to permit these wheels to follow the course of the machine or apparatus in landing, and to avoid strains due to obstructions encountered by the wheels tending to deflect such wheels out of the course followed by the apparatus upon landing, to provide automatically-acting brakes for arresting the motion of the apparatus upon landing and, furthermore, to provide means whereby the aviator may start the motor with the greatest facility and while occupying the seat upon the apparatus.

To these and other ends, the invention consists in certain improvements, and combinations and arrangements of parts, all as will be hereinafter more fully described, the novel features being pointed out particularly in the claims at the end of the specification.

In the accompanying drawing: Figures 1 and 1ª represent in parts a top plan view of an aeroplane constructed in accordance with this invention, portions of the machine being broken away and the supporting wheels being omitted; Figs. 2 and 2ª represent in parts a side elevation of the aeroplane shown in Figs. 1 and 1ª; Fig. 3 is a front elevation of the aeroplane upon a reduced scale; Fig. 4 is a detail view partly in section of the device which I have provided for automatically maintaining equilibrium of the apparatus; Fig. 5 represents an end view of the device shown in Fig. 4; Fig. 6 represents a detail section of the starting device for the motor; Fig. 7 represents a side elevation of one of the supporting wheels for the apparatus; Fig. 8 represents a sectional view of the mounting for one of the main supporting wheels showing the means for absorbing the shock to which the wheel is subjected on landing and also the means for creating a supply of compressed air which is fed to a brake for the wheel; Fig. 9 represents a front elevation of one of the main supporting wheels and its mounting; Fig. 10 is a detail enlarged sectional view showing the piston, the valves and related devices for developing a supply of compressed air to be supplied to the brake for the respective supporting wheel; Fig. 11 represents a section on the line 11—11 of Fig. 7; Fig. 12 represents a detail section of the brake cylinder and the brake shoe for one of the supporting wheels; and Fig. 13 is a detail view of the yieldable connection between the two main supporting wheels.

Similar parts are designated by the same reference characters in the several views.

The present improvements are capable of use generally in connection with various types of apparatus adapted for aerial navigation although it is particularly adapted for use in connection with aeroplanes and other apparatus of the type heavier than air. In the accompanying drawing, I have shown the invention in connection with an aeroplane and such drawing discloses the preferred embodiments of the invention. It will be understood, however, that the invention is not limited precisely to the details shown in the drawing, as modifications and changes may be made in the detail construction and in the relative arrangement of the parts in order that the invention may be applied to the best advantage according to the circumstances of each particular case.

In the present instance, I have shown one form of bi-plane having an upper main plane 1 and a lower main plane 2, and these planes are supported and maintained in proper relation by a suitable skeleton frame 3 which is held in shape by suitable stay wires 4. A frame 5 extends rearwardly from the main frame 3 and supports the tail of the aeroplane, the tail in the present instance being equipped with upper and lower stationary planes 6 and 7. A vertical rudder 8 is also mounted at the tail and preferably between the upper and lower tail planes 6 and 7, this rudder in the present instance being supported by a vertical shaft 9, and the rudder is adapted to be turned through the arc indicated by the dotted line in Fig. 1 to effect steering of the apparatus. For this purpose, the rudder is provided with a pair of arms 10 and 11 which extend laterally from opposite sides of the pivot shaft 9 and while the machine is resting upon the ground, the tail portion thereof is sustained by a caster wheel 12 which in the present instance is mounted in a fork 13 formed upon a standard 14, this standard 14 being mounted to slide vertically through bearings 15 formed upon the frame of the machine, and a compression spring 16 encircles the standard 14 and is compressible to absorb any shocks to which the wheel 12 may be subjected while the machine is landing or while the machine is traversing the ground preparatory to a flight. An elevating plane 17 is mounted at or adjacent to the tail of the machine, it preferably having a curved form substantially as shown and in the present instance this elevating plane is placed below the upper and lower tail planes 6 and 7, it being supported by a horizontal shaft 18 and this shaft is journaled at its opposite ends in bearing plates 19. These bearing plates may be supported in any suitable manner, stay wires or cables 20 being employed for the purpose in the present instance.

A frame 21 proceeds forwardly from the center of the main frame 3 and it supports at its forward end a pair of forward elevating planes 22. These forward elevating planes are also preferably of the form shown and are tiltable on a horizontal axis, a shaft 23 serving to support these forward elevating planes in the present instance, and this shaft is suitably journaled in the forward end of the frame 21. The extremities of the shaft 23 may be rigidly supported with respect to the frame 21 by the truss wires or cables 24, these cables being attached to cross arms 25 fixed to the extremities of the shaft 23, and the intermediate portions of these truss or stay wires 24 are sustained by the arms 26. To effect tilting movement of the forward elevating planes 22 about the shaft 23 as an axis, I provide the shaft 23 at opposite sides of the frame 21 with rigidly attached cross arms 27. The full and dotted lines in Fig. 2 illustrate diagrammatically the manner in which these forward elevating planes may be adjusted. The forward end of the machine is preferably equipped with a pilot wheel 28 to protect this portion of the machine in landing, this pilot wheel being suitably journaled in a bracket 29 secured to the forwardly extending frame 21.

In order to establish and maintain equilibrium of the machine during flight in a transverse or lateral direction or, in other words, to maintain a lateral balance of the machine, a pair of supplemental planes 30 and 31 are mounted between the main planes 1 and 2 and at points at opposite sides of the longitudinal center of the machine. These supplemental planes are capable of tilting motion upon horizontal axes. In the present instance, each of these supplemental planes is mounted upon a horizontal shaft 32, the ends of the shaft being journaled in bearing plates 33, and these bearing plates may be supported in proper position by stay wires 34 or any other suitable means.

The means provided by the present invention for automatically maintaining equilibrium of the machine is preferably located at or as near as practicable to the center of gravity of the machine. In the present instance such means is mounted upon the rear portion of the frame 21 and this frame also serves to support the motor 35 which operates the propeller 36. The means shown in the present instance for maintaining equilibrium of the apparatus consists of a pair of segmental plates 37 arranged in opposed relation and rigidly connected at their upper edges by a longitudinally extending plate 38. The forward and rear ends of the plate 38 have journals 39 formed thereon and these journals are rotatable in bearings 40 supported upon rigid cross pieces 41, these cross pieces being securely mounted upon the rear portion of the frame 21. The journals 39 have their axes arranged longitudinally of the machine. Arms 42 and 43 are rigidly attached to the structure composed of the plates 37 and 38 whereby these arms 42 and 43 will rotate with such structure about the journals 39 as axes. A shaft 44 extends loosely through and is journaled in the plates 37 and the axis of the shaft 44 is arranged at right angles to the axis of the journals 39. This transverse shaft 44 has a gear segment 45 fixed thereto, and the gear portion of this segment coöperates with a pinion 46, the pinion being mounted on a shaft 47 which is journaled in the opposed plates 37 and relative rotary movement between the gear segment 45 and the plates 37 will cause rotation of the pinion 46. The shaft 47 to which the pinion 46 is attached also has a pair of arms 48 fixed thereto, these arms 48 being contained between the opposed plates 37 and they rotate with the pinion 46. A yoke 49 straddles the structure composed of the plates 37 and 38 and its upper portion is rigidly connected to the transverse shaft 44. This yoke 49 forms part of a pendulum or equivalent device which is capable of maintaining a vertical position irrespective of the tilting movements of the machine. For this purpose it is provided in the present instance with a weight 50 at its lower end and in order that the machine may be operated by the aviator independently of the action of the equalizer, the yoke 49 which forms part of the pendulum is provided with an upward extension 51 having a handle 52 thereon. This handle occupies a position within convenient reach of the aviator when occupying the seat 53. The full and dotted lines in Figs. 2, 4 and 5 indicate diagrammatically the different positions capable of being occupied by the pendulum.

The device for automatically maintaining equilibrium of the machine is operatively connected by suitable means to the forward and rear elevating planes 22 and 17, to the supplemental planes 30 and 31, and also to the rudder 8. Any suitable means for connecting these parts may be used. In the present instance, I have shown cables or wires for the purpose. The upper ends of the operating arms 27 for the forward elevating planes 22 are connected by the cables 54 to the lower ends of the arms 48 while the lower ends of these operating arms 27 are connected by the cables 55 to the upper ends of the arms 48. The rear elevating plane 17 is connected at the points 56 to the cables 57 and these cables 57 are connected to the lower ends of the arms 48. The rear elevating plane 17 is also connected at the points 58 to the cables 59 and these cables 59 are connected to the upper ends of the arms 48. The right hand arm 11 attached to the rudder 8 is connected by a cable 60 to the lower end of the arm 43 and the left hand arm 10 attached to the rudder 8 is connected by a cable 61 to the lower end of the arm 43. The cables extending to the rudder 8 and the rear elevating plane 17 are suitably guided by pulleys or other means along the two sides of the frame 5 as shown. The right hand supplemental plane 31 is connected at 62 to a cable 63 which cable is connected to the lower end of the arm 42 and this right hand supplemental plane 31 is also attached at 64 to a cable 65, this cable 65 being connected to the upper end of the arm 43. The left hand supplemental plane 30 is attached at 66 to a cable 67, the cable 67 being connected to the lower end of the arm 42 and this left hand supplemental plane 30 is also attached at 68 to a cable 69, the cable 69 being connected to the upper end of the arm 43.

Under normal conditions during the flight of the machine the supplemental planes 30 and 31 at opposite sides thereof will have an equal tilt or inclination and in following a horizontal course, these supplemental planes will be in a substantially horizontal position. The forward and rear elevating planes will also occupy a substantially horizontal position and in this way, the machine will be held to a horizontal course and the machine will be balanced or in equilibrium in a lateral direction. In following a straight course, the rudder 8 will also point directly to the rear. The planes which establish and control the equilibrium of the machine with respect both to its longitudinal and transverse axes will also be maintained in their proper positions to prevent the equilibrium from being destroyed by the equalizer acting under the influence of the pendulum, the weight 50 under the influence of gravity tending to maintain a vertical position and owing to the manner in which this pendulum is supported upon the frame of the machine, the various cables extending from the operating arms of the equalizing device will maintain the controlling planes in proper position to maintain equilibrium. Should, however, one side of the machine become inclined, either upwardly or downwardly under the influence of a gust of wind or from other causes, there will be a relative rotation between the pendulum and the frame of the machine about the journals 39 as axes because of the fact that the pendulum maintains a vertical position. This relative rotation between the pendulum and the machine will cause corresponding relative rotation of the arms 42 and 43, the supplemental plane on that side of the machine which is elevated being caused to tilt or tip downwardly, while the supplemental plane on that side of the machine which is depressed is simultaneously and correspondingly inclined upwardly so as to act upon the air to reëstablish equilibrium. The rudder 8 will also be turned from the equalizing device through its cables, the rudder being turned in a direction to deflect the machine laterally and toward the upper side thereof, thereby assisting the supplemental planes in reëstablishing equilibrium. The foregoing action occurs automatically and instantly when the balance or lateral equilibrium of the machine is disturbed. Should the forward or rear end of the machine be deflected downwardly or upwardly, then there will be a relative rotation between the pendulum and the body of the machine about the transverse shaft 44 as an axis, the pinion 46 which coöperates with the segment 45 being thereby rotated and owing to the connection of the arms 48 to the forward and rear elevating planes, these planes will be adjusted automatically to return the machine to a level position with respect to its longitudinal axis. Of course, should the machine become tilted with respect both to its longitudinal and transverse axes, then the forward and rear elevating planes as well as the supplemental planes and the rudder will be adjusted automatically to reëstablish equilibrium.

The present invention also provides means which may be operated conveniently by the aviator for starting the motor, either preparatory to a flight, or, in case the motor should stop during a flight. In the present instance, the motor shaft 70 is connected by bevel gearing 71 to a countershaft 72, this countershaft having its axis arranged transversely of the machine and is journaled in suitable bearings formed in a casing 73. The shaft 72 is provided with a ratchet wheel 74 and a rocking lever 75 is loosely mounted upon the shaft 72 and has a pawl 76 which coöperates with the ratchet wheel 74. The lever 75 is of a length sufficient to enable the aviator to operate it from the seat of the machine and without disturbing his balance. Owing to the connection of the lever 75 to the shaft 72 through the medium of the ratchet wheel and pawl, a depression of the lever 75 will turn the motor shaft 70 and thereby start the motor and during the running of the motor, the lever 75 is idle.

The present invention also provides improved mountings for the main supporting wheels whereby all shock incident to landing of the machine or the travel of the machine over irregular ground, preparatory to a flight, is minimized or eliminated and upon landing the motion of the machine is arrested. In the present instance, the machine is supported principally by a pair of main wheels 77 which are placed conveniently beneath the main planes. Each of these wheels 77 is mounted on a shaft 78, this shaft being journaled in a fork 79 fixed to a standard 80. These standards are preferably inclined rearwardly in order that they may be presented substantially longitudinally to the direction of the impact sustained by the wheels during landing of the machine. The upper end of the standard 80 is fitted telescopically within a supporting tube 81, the latter being suitably secured to the frame of the machine. The lower end of the tube 81 carries a cylinder 82 and the standard 80 constitutes a piston rod which operates through this cylinder, this standard 80 having a piston head 83 attached thereto which operates within the cylinder 82, and the lower end of the cylinder 82 has a head 84 which serves as a guide for the standard 80, a vent 85 being provided to permit the atmosphere to act upon the under side of the piston head 83. The upper portion of the cylinder 82 contains an air inlet valve 86 and an air exhaust valve 87, these valves being yieldably held upon their seats by springs 88 and 89, and these valves are contained in perforated casings 90 and 91 in order to protect them. The shaft 78 of each wheel is provided with a brake drum 92 and a brake cylinder 93 is supported upon the fork 79 of each wheel and contains a piston 94 which is connected by a stem 95 to a fork-shaped brake shoe 96, this brake shoe 96 being arranged to coöperate with the brake drum 92 on the wheel shaft. A tube 97 leads into the brake cylinder 93 and its upper end extends through the piston head 83. The brake shoe 96 is normally held out of engagement with the brake drum 92 by a spring 98 but the effect of this spring is overcome by air when introduced into the upper portion of the brake cylinder through the tube 97. The outlet valve 87 is provided with a stem 99 which when the piston head 83 reaches a predetermined position engages this stem and thereby lifts this outlet valve 87 from its seat, exhausting the compressed air at the upper side of the piston head 83. A spring buffer 100 is preferably interposed between the top of the fork 79 and the bottom of the cylinder 82 to assist the air cylinder 82 in absorbing shocks. During flight of the apparatus, the wheels 77 will occupy their lowermost positions, the piston heads 83 occupying positions toward the lower ends of the cylinders 82. Upon landing, however, the pressure of the wheels upon the ground will cause the piston heads 83 to move upwardly into their respective cylinders 82 and as the valves 86 and 87 are normally closed, the air trapped in the cylinder 82 at the upper side of the piston head 83 will be compressed, thereby performing the function of an air cushion. A portion of the body of air compressed at the upper side of each piston head 83 will also be conducted through the tube 97 to the brake cylinder 93, causing the brake shoe 96 to engage the brake drum 92 and thereby acting to arrest the travel of the machine along the ground. When each piston head 83 reaches a predetermined point in its upward movement, it will engage the stem 99, thereby unseating the valve 87 and permitting the remaining compressed air in the upper end of the cylinder 82 to escape to the atmosphere, the brakes upon the supporting wheels being thereby automatically released so as not to retard the movement of the machine along the ground at the beginning of another flight. As the machine ascends in the air, the piston head 83 will settle toward the bottom of the cylinder 82 and a fresh supply of air will be drawn into the upper end of the cylinder 82 through the spring-controlled inlet valve 86.

In order to avoid breakage of the main supporting wheels, due to obstructions which would tend to deflect these wheels out of the path of the machine, the shafts 78 for these wheels are provided with a yielding connection which connection, however, will normally retain the wheels in proper position. In the present instance, the inner end of each shaft 78 is provided with a cross arm 101, the middle of each cross arm being connected by a rod 102 provided with an adjusting nut or turn-buckle 103, and the extremities of the cross arms 101 are yieldably connected by the springs 104 and the rods 105.

The ascent or descent of the aeroplane is controlled by the equilibrium maintaining device and this device may be conveniently operated by the aviator by grasping the handle 52 and tilting the pendulum in one direction or the other according to whether the machine is to ascend or descend. If, for example, the aviator desires to descend, the forward and rear adjustable planes can be tilted in the manner indicated by the dotted lines in Figs. 2 and 2ª by moving the handle 52 forward, for instance, as shown in Fig. 2. By so manipulating the handle 52, the aeroplane will be caused to descend at a suitable angle. If it is desired to ascend, the handle 52 is moved to the rear by the aviator which will result in an upward tilting of the forward edges of the front and rear adjustable planes and the aeroplane will then ascend at a suitable angle.

The course of the aeroplane in a lateral direction is also controlled by the equilibrium-maintaining device because of its connection with the steering rudder 8 and the supplemental adjustable planes 30 and 31, the connections being such that the handle 52 which is connected to the equilibrium-maintaining device can be deflected sufficiently by the aviator to direct the machine toward the right or the left. For example, if the aviator wishes to direct the aeroplane toward the right the handle 52 is moved toward the right as shown by the dotted lines in Fig. 3, the pendulum being thereby shifted toward the left, the right hand supplemental plane 30 being deflected downwardly while the left hand supplemental plane 31 is tilted upwardly, thereby tilting the aeroplane and at the same time the vertical steering rudder 8 is turned to direct the machine toward the right. A reverse movement of the handle 52 will serve to direct the aeroplane toward the left.

I claim as my invention:

1. A flying machine comprising main supporting planes, propelling means, forward and rear elevating planes adjustably mounted on horizontal axes, a rudder arranged at the tail of the machine and adjustable on a vertical axis, a pair of supplemental planes adjustably mounted on horizontal axes at opposite sides of the longitudinal center of the machine, and a device connected to the forward and rear elevating planes, the supplemental planes and also to the rudder and operative automatically by a pendulum capable of maintaining a vertical position irrespective of the position assumed by the machine, to adjust such parts about their axes to maintain equilibrium of the apparatus with respect both to its longitudinal and transverse axes, the supplemental planes of one side being turned in reverse direction with respect to the supplemental plane of the other side of the machine and the rudder being turned to deflect the machine laterally and toward the side thereof opposed to the side downwardly inclined.

2. In a flying machine, the combination of main supporting planes, propelling means, and adjustable planes for establishing and maintaining equilibrium, of a device for automatically operating the adjustable planes to maintain such equilibrium, such device being mounted in the center of gravity of the machine and embodying a frame suspended on a longitudinal axis with respect to the machine, a pendulum provided with a counterweight suspended on a shaft carried by said frame, such shaft being perpendicular to the longitudinal axis of the machine, a gear operatively connected to swing with the pendulum, a pinion coöperative with said gear and having operating arms fixed thereto, and operating arms fixed to swing with said frame about its longitudinal axis, the operating arms on the frame and the operating arms fixed to the pinion shaft being connected to the different adjusting planes of the machine whereby such planes will be automatically shifted to maintain equilibrium of the machine.

3. In a flying machine, the combination of main supporting planes, propelling means, forward and rear elevating planes adjustably mounted on horizontal axes, a rudder arranged at the tail of the machine and adjustable on a vertical axis, and supplemental planes adjustably mounted on horizontal axes at opposite sides of the longitudinal center of the machine, of a device for automatically operating the forward and rear planes, the supplemental planes and the rudder to establish and maintain equilibrium of the machine, such device embodying a frame suspended on a longitudinal axis with respect to the machine, a pendulum provided with a counterweight suspended on a shaft carried by said frame, such shaft being perpendicular to the longitudinal axis of the machine, a gear operatively connected to swing with the pendulum, a pinion coöperative with said gear and having operating arms fixed to turn therewith, and operating arms fixed to swing with said frame about its longitudinal axis, the operating arms in the frame and the operating arms fixed to turn with said pinion being connected to the different adjusting planes of the machine whereby such planes will be automatically shifted to maintain equilibrium of the machine, and a handle attached to the pendulum whereby the aviator may move the pendulum forwardly or rearwardly and laterally in either direction to cause ascent or descent of the machine and to deflect the same laterally.

4. In an aeroplane, the combination of main supporting planes, propelling means, a rudder arranged at the tail of the machine and adjustable on a vertical axis, and supplemental planes adjustably mounted on horizontal axes at opposite sides of the longitudinal center of the aeroplane, of a device for automatically operating the rudder and the supplemental planes to establish and maintain lateral equilibrium of the aeroplane, such device embodying a frame suspended on a horizontal axis, a pendulum provided with a counterweight suspended on a shaft carried by said frame, such shaft being perpendicular to the suspension axis of the frame, and operating arms fixed to swing with said frame about its suspension axis, the operating arms in the frame being connected to the supplemental planes and to the rudder of the aeroplane whereby the supplemental planes at one side of the aeroplane will be automatically shifted in reverse direction with respect to the supplemental planes at the other side of the aeroplane and the rudder will be automatically shifted to deflect the aeroplane laterally and toward the side thereof opposed to the downwardly inclined side.

5. In an aeroplane, the combination of main supporting planes, propelling means, and forward and rear elevating planes adjustably mounted on horizontal axes, of a device for automatically operating the forward and rear planes to establish and maintain equilibrium on the longitudinal axis of the aeroplane, such device embodying a frame suspended on a horizontal axis, a pendulum provided with a counterweight suspended on a shaft carried by said frame, such shaft being perpendicular to the suspension axis of the frame, a gear operatively connected to swing with the pendulum, and a pinion coöperative with said gear and having operating arms fixed thereto, said operating arms being connected to the forward and rear elevating planes of the aeroplane whereby such planes will be automatically shifted to maintain the equilibrium of the aeroplane on its longitudinal axis.

In testimony whereof I have hereunto set my hand in presence of two subscribing witnesses.

MANUEL B. SAAVEDRA.

Witnesses:
RICARDO MORÉ,
HENRY P. STANETT.